United States Patent [19]
Takeda

[11] Patent Number: 5,474,749
[45] Date of Patent: Dec. 12, 1995

[54] OZONE REACTION DEVICE

[75] Inventor: Masahiro Takeda, Urawa, Japan

[73] Assignee: Yuugen Kaisha OHL Hydrodynamics Laboratory, Iruma, Japan

[21] Appl. No.: 334,394

[22] Filed: Nov. 3, 1994

[30] Foreign Application Priority Data

Nov. 4, 1993 [JP] Japan .................................. 5-308501

[51] Int. Cl.$^6$ ..................................................... C02F 1/78
[52] U.S. Cl. ................................ 422/186.07; 422/186.08; 422/186.12; 210/760
[58] Field of Search ....................... 210/760; 422/186.07, 422/186.08, 186.12

[56] References Cited

U.S. PATENT DOCUMENTS

| | | | |
|---|---|---|---|
| 1,077,020 | 10/1913 | Walden | 422/186.07 |
| 3,326,747 | 6/1967 | Ryan et al. | 167/17 |
| 3,823,728 | 7/1974 | Burris | 137/88 |
| 4,029,578 | 6/1977 | Turk | 210/63 Z |
| 4,053,399 | 10/1977 | Donnelly et al. | 210/44 |
| 4,172,786 | 10/1979 | Humphrey et al. | 210/57 |
| 4,252,654 | 2/1981 | Leitzke et al. | 210/760 |
| 4,265,747 | 5/1981 | Copa et al. | 210/758 |
| 4,430,306 | 2/1984 | Namba et al. | 422/292 |
| 4,507,253 | 3/1985 | Wiesmann | 261/22 |
| 4,963,269 | 10/1990 | Sasaki et al. | 210/760 |
| 5,032,292 | 7/1991 | Conrad | 210/764 |
| 5,075,016 | 12/1991 | Barnes | 210/760 |

Primary Examiner—Donald P. Walsh
Assistant Examiner—Daniel Jenkins
Attorney, Agent, or Firm—Armstrong, Westerman, Hattori, McLeland & Naughton

[57] ABSTRACT

An ozone reaction apparatus comprises an outer vessel 1 having an inlet 2, an exit 3 and a treated water drain port 4 each attached to a lower portion thereof, an inner vessel 5 disposed in the outer vessel 1 having an inlet connection pipe 6 and an exit connection pipe 7 each attached to a lower portion thereof, in which the flow inlet 2 is connected with the inlet connection pipe 6 and the exit 3 is connected with the exit connection pipe 7. A stirring device 8 is provided to the fluid inlet side of the inlet 2 in which the exit 3 and the stirring device 8 are connected by way of a suction pipe 9, a circulation pump 10 and an exit pipe 11, the suction pipe 9 is connected with a raw water inlet pipe 12 and the exit pipe 11 is connected with a gas supply pipe 13 of an ozone generation device. A partitioning control ring disc 14 is attached coaxially to the inner vessel 2. The stirring device 8 comprises a flow deflection structure and an ozone reaction zone disposed at the downstream thereof. Ozone in the ozonized air can be effectively used for oxidizing reaction.

6 Claims, 2 Drawing Sheets

FLUID INLET SIDE

OZONE REACTION DEVICE

BACKGROUND OF THE INVENTION

1. Field of the Invention

The present Invention is related to fields of public pollution and hygiene and it concerns an ozone reaction apparatus used generally for the treatment of various kinds of waste water and service water such as discoloration, deodorization and sterilization of waste water.

2. Description of the Prior Art

Various techniques of using ozone, for example, for discoloration, deodorization and sterilization of waste water have been developed. The purpose of such treatments is attained by the ozone reaction technique of dispersing ozone-containing air generated from an ozone generation device (hereinafter referred to as ozonized air) into polluted water by using a dispersing device such as an aeration device and utilizing the oxidizing power of ozone dissolved in water.

In tire ozone reaction technique or the prior art, ozonized air containing a lean ozone generated from an ozone generation device is merely dispersed in water and ozone reaction is taken place based on the solubility of ozone and air in water as the rate of determination.

However, since a probability of collision between a small amount of ozone molecules dissolved in water and particles suspended in polluted water to be treated is low, collision between the ozone molecules and the target particles seldom occurs In the reaction operation by existent diffusion devices such as an aeration device, and this necessitates the use of a great amount of ozonized air for attaining the purpose of the treatment and, accordingly, a great &mount of unreacted ozone is produced.

Therefore, it is necessary to adsorb unreacted ozone by using a great amount of adsorbents such as activated carbon with a view point of protecting human bodies against toxic unreacted ozone or additionally provide two or three units of ozone reaction apparatus in order to reutilize the unreacted ozone, which results in a problem of increasing the running cost and enlarging the scale of the facility.

OBJECT OF THE INVENTION

It is, accordingly, an object of the present invention to provide an apparatus capable of remarkably decreasing the amount of produced unreacted ozone to such an extent as not requiring adsorbents such as activated carbon thereby effectively utilizing ozone, while taking a notice on the physical property of ozone and by simple procedures in a small-scaled apparatus by virtue of highly excited reaction by dynamically separating ozone from air and causing it to collide directly with polluted water in an extraordinarily disturbed state.

SUMMARY OF THE INVENTION

The foregoing object of the present invention can be attained in an ozone reaction apparatus according to the present invention comprising:

an outer vessel of a predetermined capacity for the amount of treated water after reaction and having an inlet, an exit and a treated water drain port each attached to a lower portion of the outer vessel, an inner vessel disposed for promoting reaction in the outer vessel and having an inlet connection pipe in communication with the inlet and an exit connection pipe in communication with the exit each attached to a lower portion of the inner vessel, a stirring device disposed to the fluid inlet side of the inlet, in which the exit and the stirring device are connected by way of a suction pipe, a circulation pump and an exit pipe, the suction pipe is connected with a raw water inlet pipe and the exit pipe is connected with a gas supply pipe from an ozone generation device.

In order to ensure a sufficient time for oxidized particles in treated water after completion of oxidizing reaction with ozone so that they are converted into stable reaction products in the outer vessel, it is desirable that the outer vessel has such a capacity such that a fluid entering from the upper end of the inner vessel to the inside of the outer vessel descends along a portion of the outer vessel at the surroundings of the inner vessel and is then discharged, after all adequate staying time, from the treated water drain port attached at the lower portion of the outer vessel.

A partitioning control disc is desirably attached in the inner vessel above the inlet connection pipe and the exit connection pipe thereof for providing a function of partitioning and controlling the capacity in a circulation portion below the inner vessel partitioned by the partitioning control disc so as to increase the number of contact between circulating water in the circulation portion and ozonized air in a predetermined unit period of time and a function of reducing the cross sectional area of the inner vessel such that the circulating water does not exit upwardly by the compressing effect to the circulation portion caused by water pressure based on the depth of water at the exit above the inner vessel before reaching sufficient ozone reaction and such that the liquid after undergoing ozone reaction ascends smoothly. It is desirable that a ring-shaped partitioning control disc having an appropriate width is attached along the inner circumferential surface of the inner vessel in the transversing direction of the inner vessel.

Referring to the stirring device, in order to decrease the amount of unreacted ozone by virtue of highly efficient reaction between ozone and raw water, it is necessary that ozone is dynamically separated from ozonized air in the course of fluid flowing motion by large inertia caused by the mass of ozone and swirling motion of a fluid mixture of ozonized air, circulating water and raw water and exciting substance transfer velocity and by direct contact between ozone and raw water.

The stirring device has a flow deflecting structure defined by disposing two blade discs substantially similar with each other and each having a half-way cut elliptic shape at a fluid inlet side of a tube which is directed at one end to the fluid inlet side and connected at the other end with the inlet of the outer vessel, crossing the discs in a symmetrical relationship with respect to the central axis of the tube, with chordal sides of the blade discs being opposed to each other, closing a space between the chordal sides of the two blade discs situating on the fluid inlet side upstream of the crossing point by a triangular partition plate that substantially bisects a transversal plane of the tube and securing arcuate edges of the blade discs to the inner circumferential wall of the tube, and a reaction region formed by disposing one or more of protrusions each of which is one-piece molded from a semi-spherical head with the top end directed to the central axis of the tube, and a leg of an inverted frustconical shape along the inner circumferential wall of the tube succeeding to the flow deflecting structure and radially to the central axis of the tube.

In the ozone reaction device having the constitution as described above, an efficient oxidizing reaction is taken place between the circulating water in the circulation portion of the inner vessel and the raw water and, the ozonized air added and entered thereto, and water treated by the oxidizing reaction is discharged, after a predetermined staying period of time in the outer vessel, to the outside of the apparatus.

Specifically, a fluid mixture comprising the circulating water, the raw water and the ozonized air each of which is adjusted to a predetermined flow rate ratio is put to highly oxidative reaction under the effect, for example, of mixing under stirring, separation of ozone from the ozonized air and collision between the separated ozone molecules and liquid particles that are attained during passage of the fluid mixture through the stirring device. In this instance, the circulating water having a large volume and a flow rate relative to the entire flow rate is passed compulsorily in the circulation portion the capacity of which is reduced and controlled by the partitioning control disc at an appropriate ratio to the amount of the circulating water in a predetermined unit period of time, and caused to pass through the stirring device by the number of times reciprocal to the reducing ratio within the predetermined unit period of time. Then, the fluid mixture undergoes homogeneous and efficient oxidizing reaction in the course of stirring and mixing in an extraordinarily disturbed state of the fluid mixture in the circulation portion, into a state in which unreacted ozone is scarcely present, while the treated water ascending from the circulation portion to the inlet in the upper portion enters and diffuses to the water level in the outer vessel, and oxidized particles in the treated water are converted into stable reaction products within an appropriate staying time in the outer vessel and then discharged from the lower portion of the outer vessel.

In the course of the oxidizing reaction described above, the gas/liquid fluid mixture comprising the ozonized air supplied from the gas supply pipe connected to the exit pipe, the raw water entering from the raw water inlet pipe connected to the suction pipe and the circulating water is at first rectified by the partition plate of the flow deflecting structure In an instantaneous passage through the stirring device and partitioned into two branched flows each of a substantially equal flow rate by a concentrated kinetic energy without generating vortexes at the upstream of the partition plate, induced into swirling flows by two blade discs which are similar to each other, each of a halfway-cut elliptic shape and disposed so as to surround the partition plate and swirl around and passes through two spiral flow deflecting pathways defined with the partition plate, the blade discs and the inner circumferential wall of the flow deflecting structure.

When such a fluid is abruptly separated momentarily and changes the flows direction abruptly in the course of flowing, a large shearing stress is generated and the fluid is converted into turbulent flows under the effect of shearing stress to exert a large stirring effect on the gas/liquid fluid mixture.

Further, since a minimum opening cross sectional area of the flow deflecting pathway is greatly restricted as compared with the cross sectional area of the flow deflecting structure, the turbulent swirling fluid passing through the flow deflecting pathway is greatly compressed and accelerated and advances under swirling to a reaction region which disposed succeeding to the flow deflecting structure under the effect of a large inertia.

Since the cross sectional area of the reaction region is enlarged greatly as compared with the minimum opening cross sectional area of the flow deflecting structure, the turbulent swirling flow entering the reaction region generates a negative pressure in proportion with the square of the swirling velocity, creates a cylindrical low pressure portion of a diameter providing a transversing cross sectional area approximate to a area obtained by subtracting the total area of the minimum opening cross sectional area from the transverse cross sectional area of the reaction region along the control axis of the reaction region, and swirls and passes around the low pressure portion.

Since the gas/liquid fluid mixture swirling and passing around the cylindrical low pressure portion at a negative pressure has a high and positive pressure, the fluid mixture in the reaction region undergoes remarkable reduction of the saturated vapor pressure for each of gas and liquid under an extraordinarily large pressure gradient, suffers from severe effect of mixing and stirring, so-to-speak, a low temperature boiling, by which molecular movement of each of fluid particles constituting the fluid is excited, and membrane resistance between each of the particles is reduced by molecular vibrations to form a swirling fluid in an extraordinarily disturbed state of gas and liquid in which the material transfer velocity is increased abruptly.

In the extraordinarily disturbed swirling fluids, a liquid component of a relatively large mass among the gas/liquid component constituting the fluid mixture moves in the radial outward direction of the reaction region to stratify along the flowing bed of the reaction region, while the gaseous ingredient of a relatively small mass moves in the radial inward direction of the reaction region to stratify in contact at a boundary with the stratified liquid and also in contact at a boundary with the low pressure portion by virtue of the inertia.

In this course, ozone having a greater mass than air is separated from the ozonized air and forms an ozone layer in contact with the liquid layer.

That is, the fluid mixture is converted into a steady multi-layered flow having each of swirling flows in an extraordinarily disturbed state.

Further, in the stratified swirling fluids, the flow velocity of the fluid flowing at the inside is greater than the flowing velocity of the fluid flowing at the outside.

Then, a plurality of blunt protrusions are disposed radially relative to the axial center of the reaction region along the inner circumferential wall of the reaction region (flowing bed) on which the swirling fluids flow each of the protrusions is one-piece molded from a semi-spherical head with the top of the head being directed to the control axis of the reaction region and an inverted frustconical leg having an upper edge formed in common with the lower edge of the head arid having a height greater than an average layer thickness of the stratified liquid.

Accordingly, the stratified gas/liquid swirling fluids are caused to collide against a group of the protrusions and shed in the horizontal direction of the flow by sharp edges of the protrusions to generate cavitation, whereby they undergo severe sonic vibrations caused by the acoustic effect at the inside of the swirling flow and are further stirred and mixed sufficiently by the combined effect, for example, of drag resistance and frictional resistance of the blunt protrusions, as well as the momentum and the direction of movement inherent to the physical property for each of the gas and liquid components constituting the swirling flows.

Specifically, the liquid layer swirling on the flowing bed collides against the blunt leg and increases the volume in front of the collision area and climbs up the side of the leg as far as the top of the head overriding the sharp edges to form a liquid membrane like that a phenomenon observed between a stake and running water in a river. Since such motion of the swirling flow is regarded as a not uniform circular motion, the initial velocity required for a portion of the liquid to climb up to the top of the head is defined as greater than $(5 \times \text{acceleration gravity} \times \text{entire height of projections})^{0.5}$ in accordance with the law of energy conservation, but such a velocity can not always be obtained, depending on the case, by the kinetic force of the liquid layer.

On the other hand, a gaseous layer swirling more rapidly than the liquid layer in contact at the boundary with the liquid layer at the inside of the liquid layer also collides against the protrusion and is shed into upper and lower two branched flows by the sharp edges of the protrusion. Since the lower branches flows in contact at a boundary with the liquid layer, the surface portion of the liquid layer is accelerated by a kinetic force given from the gaseous layer, which satisfies the initial velocity required for the not uniform circular motion to for a definite liquid membrane on the head of the protrusion. The upper branched flow collides against blunt side angles near the lower edge of the head of the protrusion. The liquid membrane seated at the head of the protrusion can be regarded as a boundary layer, so that similar to the peeling phenomenon of the boundary layer at the surface of a plane in a case where a flying aircraft falls as a result of taking an unnatural ascending angle, the liquid membrane is peeled off the seated surface of the head and scattered and dispersed as a great amount of minute liquid droplets in the ozone layer and the gaseous layer behind the flow.

Since the behavior of the fluid undergoes the effect of large inertia, the minute liquid droplets scattered in the ozone layer and the gaseous layer are directed to the radial outward of the reaction region and returned to and joined with the original liquid layer, whereas gaseous particles separated from the liquid layer by the cavitation are directed in the central axis of the reaction region and Joined with the original gaseous layer.

Accordingly, the gas and liquid particles provide no balance at the boundary membrane between each of the particles by transferring to mating streams but bring about extraordinarily large reaction effect caused by complicate collision between each of a great amount of particles directed to the opposite directions and extraordinarily large reaction effect based on enormous mass transfer amount when the particles collide against and join with the original fluid layer, so that ozone separated from the ozonized air as described above can react easily with the liquid momentarily.

However, in the ozone reaction operation, since the ozone concentration in the ozonized air is low and there is little possibility of collision between the ozone molecules and the liquid particles, no sufficient oxidizing reaction can be obtained, depending on the case, by a one pass operation in the stirring device.

As a countermeasure, the capacity of the circulation portion to the amount of the circulating water having a greater flow rate ratio as compared with the amount of raw water entered In a predetermined unit period of time is reduced at an adequate reducing ratio as compared with the amount of the circulating water per predetermined unit period of time of the circulating water. The circulating water passes through the stirring device in the predetermined unit period of time by the number of times corresponding to the reciprocal of the reducing ratio and the inside of the circulation portion is led to an extraordinarily disturbed state by the imbalanced stirring motion caused by the intrusion of a great amount of the circulating water in the circulation portion reduced with the capacity, so that the possibility of collision between the ozone molecules and the liquid particles is increased outstandingly to take place such a sufficient gas/liquid oxidizing reaction that no unreacted ozone is recognized.

Further, since the raw water entering from the suction pipe to the circulation system always passes through the stirring device at least for once, there is no worry that the raw water flows as it is without reaction from the ozone reaction apparatus.

Furthermore, since the circulation portion undergoes compression due to the water depth and the water pressure of the exit situating above, the circulating water conducts stable circulating motion in the circulation system, while the treated water in an amount proportional with the amount of the raw water smoothly ascends from the reduced opening of the partitioning control disc through the exit, diffuses while advancing to the water surface of the outer vessel, descends in the outer vessel having a capacity capable of ensuring a time necessary for converting oxidized particles in the treated water completed with oxidizing reaction of ozone into stable reaction products in the outer vessel, for a predetermined staying time, and is then discharged to the outside from the lower portion of the outer vessel.

As has been described above, in the ozone reaction apparatus according to the present invention, since ozone is separated from the ozonized air and caused to collide against the polluted water directly, the amount of the unreacted ozone produced can be reduced remarkably and ozone can be utilized effectively by simple procedures in a small-sized apparatus without using adsorbents such as activated carbon.

BRIEF DESCRIPTION OF THE DRAWINGS

These and other objects, advantages and features of the present invention will become more apparent by reference to the following detailed descriptions for a preferred embodiment of the present invention in conjunction with the appended drawings, wherein.

DESCRIPTION OF THE PREFERRED EMBODIMENT

Figure 1:
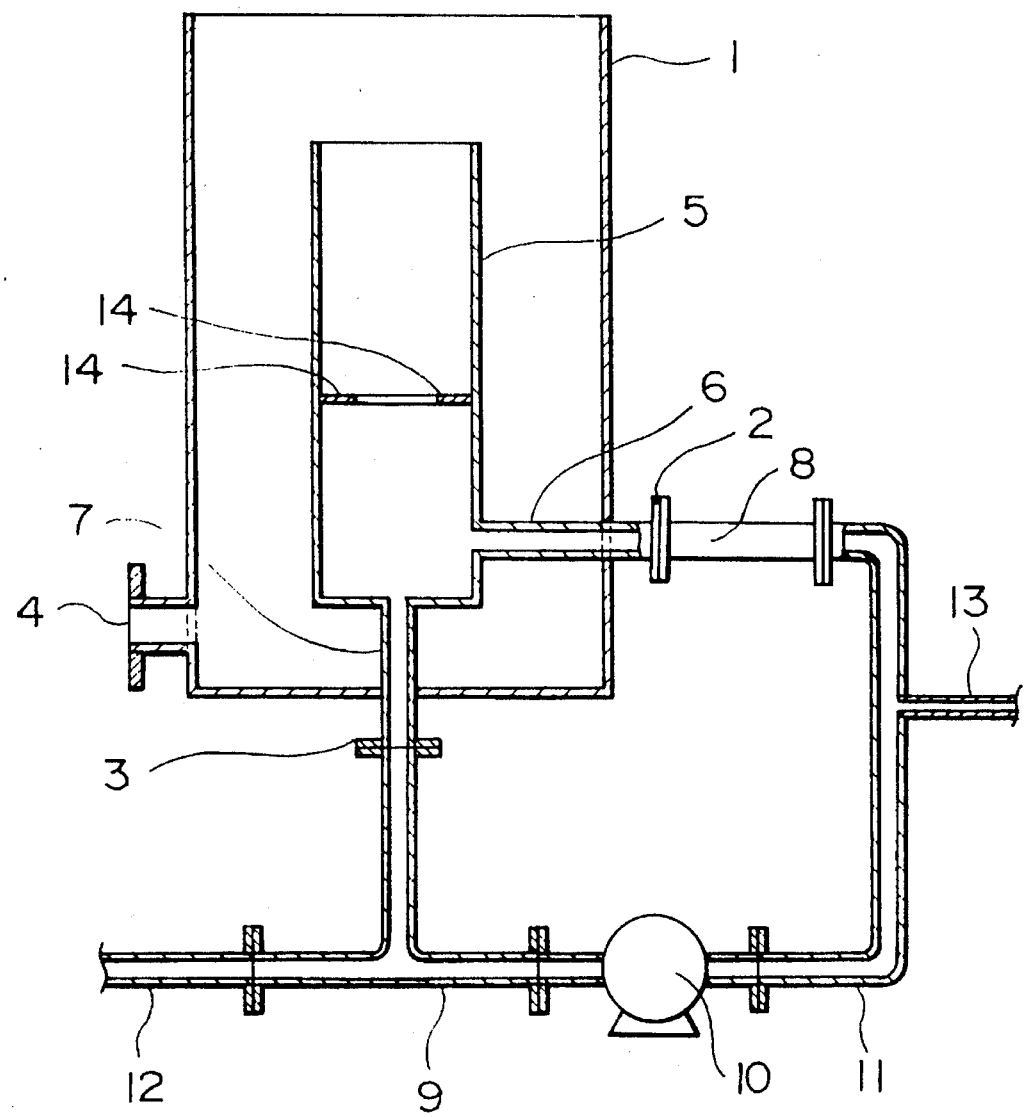
FIG. 1 is a vertical cross sectional view of an ozone reaction apparatus.

Descriptions will be made to the present invention by way of a preferred embodiment. In FIG. 1, an outer vessel 1 has an inlet 2, an exit 3, and a treated water drain port 4 attached to a lower portion of the vessel 1. An inner vessel 5 is disposed in the outer vessel 1 and has an inlet connection pipe 6 and an exit connection pipe 7 each connected at a lower portion of the vessel 5. The inlet 2 is connected with the inlet connection pipe 6, the exit 3 is connected with the exit connection pipe 7. A stirring device 8 is attached to the fluid inlet side of the inlet 2. The exit 2 and the stirring device 8 are connected by way of a suction pipe 9, a circulation pump 10 and an exit pipe 11. The suction pipe 9 is connected with a raw water inlet pipe 12 and the exit pipe 11 is connected with a gas supply pipe from of an ozone generation device (not illustrated).

Figure 2:
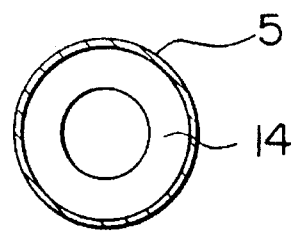
FIG. 2 is a plan view for a partitioning control disc.
Figure 3:
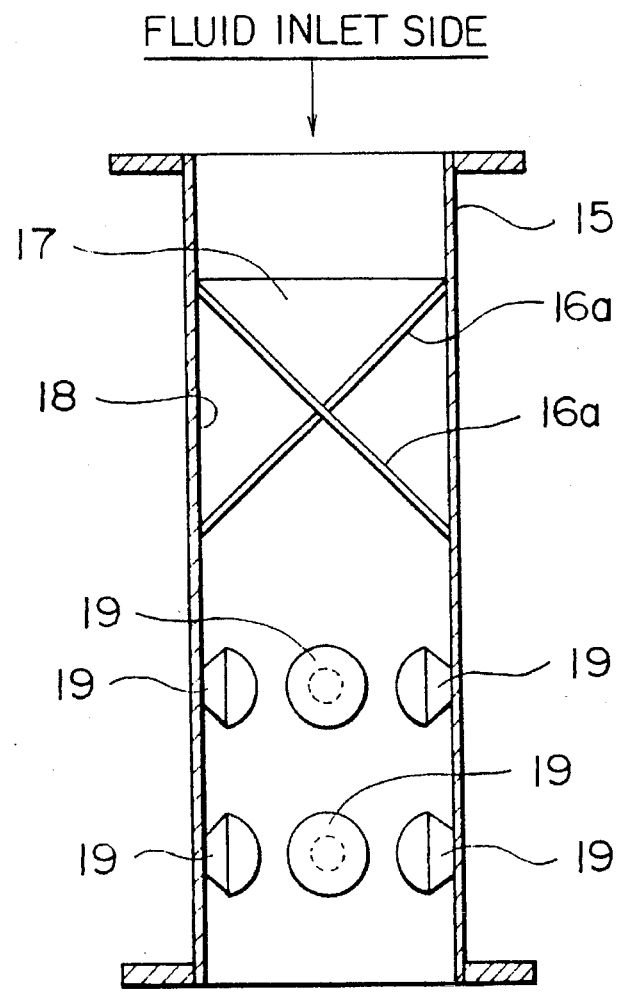
FIG. 3 is a vertical cross sectional view of a stirring device.
Figure 4:
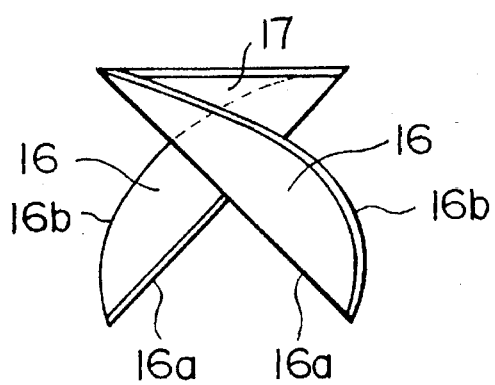
FIG. 4 is a perspective view of blade discs and a partition plate in an assembled state.
Figure 5:
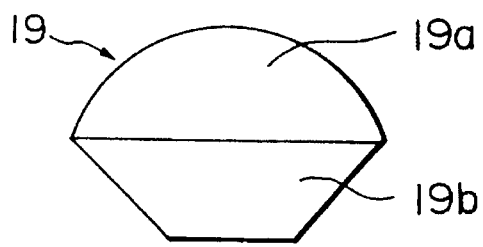
FIG. 5 is a vertical cross sectional view of a projection.

In the embodiment shown in FIG. 2, a ring-shaped partitioning control disc 14 having an adequate width is attached In the inner vessel 5 along the inner circumference surface of the vessel 5 in the transversing direction thereof at a position above the inlet connection pipe 6 and the exit connection pipe 7 attached to the inner vessel 5.

The stirring device 8 comprises a flow deflecting structure defined by disposing two blade discs 16 substantially similar with each other and each having a half-way cut elliptic shape at a fluid inlet side of a tube 15 which is directed at one end to the fluid inlet side and connected at the other end with the inlet 2 of the outer vessel 1, opposing the discs 16 in a symmetrical relationship with respect to the central axis of the tube 15, with chordal sides 16a of the blade discs 16 being opposed to each other, closing a space between the chordal sides 16a of the two blade discs 16 situating on the fluid inlet side upstream of the crossing point by a triangular partition plate 17 that substantially bisects a transversal plane of the tube 15 and securing arcuate edges 16b of the blade discs 16 to the inner circumferential wall 18 of the tube 15, and a reaction region defined by disposing one of more of protrusions 19 each of which is one-piece molded from a semi-spherical head 19a with the top end directed to the central axis of the tube 15 and a leg 19b of an inverted frustconical shape along the inner circumferential wall 18 of the tube 15 succeeding to the flow deflecting structure radially to the central axis of the tube 15.

The present invention comprising the constitution as described above can provide the following advantageous effects.

Since the partitioning control plate is disposed in the inner vessel, the capacity of the circulation portion can be reduced and controlled at an adequate ratio to the amount of the circulating water in a predetermined unit period of time and the range for the effect of the water depth and the water pressure in the exit can be controlled, so that extraordinarily stable oxidizing reaction operation can be conducted easily by merely controlling the flow rate of ozone supplied relative to fluctuation of the turbidity of the polluted raw water.

Since the raw water inlet pipe is connected with the suction pipe, the raw water always passes through the stirring device at least for once and is in contact and reacted with ozone, raw water not yet undergoing reaction does not flow out of the reaction apparatus.

Since the inner vessel is disposed in the outer vessel, the treated water flowing out of the upper end of the inner vessel enters and diffuses smoothly in a water region of the outer vessel at the surroundings of the inner vessel, so that foaming impurities, if incorporated in the raw water, can be discharged easily from the upper end of the outer vessel.

Since the exit and the stirring device are connected by way of the suction pipe, the circulation pump and the exit pipe, the raw water inlet pipe is connected with the suction pipe and the gas supply pipe is connected with the exit pipe, the circulation amount of the circulating water, the amount of the entered raw water and the amount of the entered gas can be controlled and adjusted easily from the outside, so that the state of motion of the fluid formed as described above in the circulation system can easily be recognized and controlled and stable ozone reaction operation can be conducted easily with scarce generation of unreacted ozone.

In accordance with the present invention, since a highly efficient treatment by ozone oxidizing reaction can be conducted with one set of simple apparatus by the dynamic operation, the scale of the apparatus can be reduced and unreacted ozone is scarcely generated, so that no expensive adsorbents for adsorption of unreacted ozone is necessary.

What is claimed is:

1. An ozone reaction apparatus comprising:

an outer vessel having an inlet, an exit and a treated water drain port each attached to a lower portion of said outer vessel, an inner vessel disposed in said outer vessel having an inlet connection pipe and an exit connection pipe each attached to a lower portion of said inner vessel, said inlet being connected with said inlet connection pipe and said exit being connected with said exit connection pipe, and a stirring device connected to an upstream end of said inlet on a first end and in fluid communication with said exit and a raw water inlet pipe on a second end; a gas supply pipe from an ozone generation device in fluid communication upstream of stirring device.

2. An ozone reaction apparatus as defined in claim 1, wherein a ring-shaped partitioning control disc having an appropriate width is attached in the inner vessel along the inner circumferential wall of the inner vessel in a transversal direction of the inner vessel at a position above the inlet connection pipe and the exit connection pipe each attached to the inner vessel.

3. An ozone reaction apparatus as defined in claim 1, wherein the stirring device comprises:

a flow deflecting structure defined by disposing two blade discs substantially similar with each other and each having a half-way cut elliptic shape at a fluid inlet side of a tube which is directed at one end to the fluid inlet side and connected at the other end with the inlet of the outer vessel, crossing the disc in a symmetrical relationship with respect to the central axis of the tube, with chordal sides of the blade discs being opposed to each other, closing a space between the chordal sides of said two blade discs situating on the fluid inlet side upstream of the crossing point by a triangular partition plate that substantially bisects a transversal plane of the tube and securing arcuate edges of said blade discs to the inner circumferential wall of said tube, and a reaction region defined by disposing one or more of protrusions each of which is one-piece molded from a semi-spherical head with the top end directed to the central axis of the tube, and a leg of an inverted frustconical shape along the inner circumferential wall of the tube succeeding to said flow deflecting structure and radially to the central axis of the tube.

4. The ozone reaction apparatus of claim 1, further comprising:

a circulation pump, connecting said second end of said stirring device to said raw water inlet pipe and said exit pipe.

5. The ozone reaction apparatus of claim 4, further comprising:

a connection pipe (11), interposed between said stirring device and said circulation pump;

wherein said gas supply pipe is attached to said connection pipe to feed ozone gas to said stirring device.

6. The ozone reaction apparatus of claim 5, further comprising:

a suction pipe, connecting said exit and said raw water inlet pipe to an upstream inlet of said circulation pump.

* * * * *